(12) United States Patent
Kohli

(10) Patent No.: US 10,230,711 B2
(45) Date of Patent: Mar. 12, 2019

(54) SYSTEM AND METHODS FOR ENHANCING AUTHENTICATION PROCEDURES IN AN ANTI-FRAUD ENVIRONMENT

(71) Applicant: MASTERCARD INTERNATIONAL INCORPORATED, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 341 days.

(21) Appl. No.: 15/231,259

(22) Filed: Aug. 8, 2016

(65) Prior Publication Data
US 2018/0041488 A1 Feb. 8, 2018

(51) Int. Cl.
H04L 29/06 (2006.01)

(52) U.S. Cl.
CPC ............ *H04L 63/08* (2013.01); *H04L 63/102* (2013.01); *H04L 63/20* (2013.01)

(58) Field of Classification Search
CPC ........ H04L 63/08; H04L 63/20; H04L 63/102
See application file for complete search history.

(56) References Cited

U.S. PATENT DOCUMENTS

| | | | | |
|---|---|---|---|---|
| 7,614,078 B1* | 11/2009 | Stieglitz | ................ | H04L 9/321 380/247 |
| 9,537,845 B1* | 1/2017 | Juels | .................. | H04L 63/08 |
| 2005/0097320 A1* | 5/2005 | Golan | .................. | G06F 21/40 713/166 |
| 2006/0179007 A1* | 8/2006 | Davis | .................. | G06Q 20/02 705/67 |
| 2007/0157308 A1* | 7/2007 | Bardsley | ............. | H04L 63/08 726/15 |
| 2017/0286648 A1* | 10/2017 | Yamaguchi | ........ | G06F 21/31 |

\* cited by examiner

*Primary Examiner* — Christopher C Harris
(74) *Attorney, Agent, or Firm* — Michael Best & Friedrich LLP

(57) ABSTRACT

A system, method, and computer readable medium enhance authentication procedures in an anti-fraud environment when an access control server (ACS) is unavailable to generate a full authentication for unique identifying information received in a current communication from a website. An availability detector verifies that the access control server remains unavailable. A successful authentication identifier requests previous authentication information for a previous communication occurring during a predefined authentication period and corresponding to the unique identifying information. A full authentication generator upgrades the unique identifying information to the full authentication based upon the previous authentication information when the access control server is verified as remaining unavailable. The upgrade to full authentication prevents the current communication from being flagged as fraudulent.

17 Claims, 4 Drawing Sheets

SYSTEM AND METHODS FOR ENHANCING AUTHENTICATION PROCEDURES IN AN ANTI-FRAUD ENVIRONMENT

BACKGROUND

Interaction with a web site to obtain requested items from an entity associated with the web site entails submission of unique identifying information by a requestor that demonstrate the requestor is who it purports to be. Typically, the requestor is asked to enter additional information (e.g., a password or PIN) and a primary access control server (primary ACS) serves to identify/authenticate the requestor as the entity associated with the unique identifying information. When all proceeds normally, the primary ACS generates full authentication for the request, which allows the requestor to receive the requested items and the entity associated with the web site to be remunerated. However, when the primary ACS is unavailable, even though the unique identifying information is entered correctly, the unique identifying information is not fully authorized, and at best a "partial authentication" is issued by a backup ACS (which serves as a back-up mechanism for the primary ACS) that is invoked in place of the primary ACS. However, the issued partial authentication may not be acceptable to subsequent entities using the unique identifying information, and the entity receiving the request for the items (i.e., the entity associated with the web site) typically treats the communication as fraudulent, which it typically may do at its discretion. Thus, sales opportunity is lost. Regulations in certain countries may also mandate that communications be fully authenticated for subsequent approval, thereby also causing lost sales opportunities for the entity associated with the website when full authentication is not possible.

SUMMARY

In an anti-fraud environment, enhanced authentication systems and methods provide additional authentication steps to authenticate unique identifying information of a requestor when conventional access control server authentication is unavailable. These additional authentication steps validate the unavailability of the access control server, and validate the unique identifying information against previous authentications that correspond to the unique identifying information. Where the unavailability of the access control server appears genuine, and the unique identifying information has recently been fully authenticated, authentication of the unique identifying information is upgraded from a partial authentication to a full authentication such that the unique identifying information is not treated as fraudulent.

In one embodiment, a method enhances authentication procedures in an anti-fraud environment when a primary access control server is unavailable to generate a full authentication for unique identifying information received in a current communication from a website. The primary access control server is verified as remaining unavailable. Previous authentication information for a previous communication occurring during a predefined authentication period and corresponding to the unique identifying information is requested from a history server. When the primary access control server is verified as remaining unavailable, authentication of the unique identifying information is upgraded to the full authentication based upon the previous authentication information retrieved from the history server. An indication of the full authentication is sent to the website when authentication is upgraded to the full authentication. The full authentication has a higher likelihood of being accepted for further processing of the unique identifying information than a partial authentication.

In another embodiment, non-transitory computer readable medium with computer executable instructions stored thereon is executed by a processor to perform a method for enhancing authentication procedures in an anti-fraud environment when a primary access control server is unavailable to generate a full authentication for unique identifying information received in a current communication from a website. The primary access control server is verified as remaining unavailable. Previous authentication information for a previous communication occurring during a predefined authentication period and corresponding to the unique identifying information is requested from a history server. When the primary access control server is verified as remaining unavailable, authentication of the unique identifying information is upgraded to the full authentication based upon the previous authentication information retrieved from the history server. An indication of the full authentication is sent to the website when authentication is upgraded to the full authentication. The full authentication has a higher likelihood of being accepted for further processing of the unique identifying information than a partial authentication.

In another embodiment, a system enhances authentication procedures in an anti-fraud environment when a primary access control server is unavailable to generate a full authentication for unique identifying information received in a current communication from a website. The system includes a processor, a memory communicatively coupled with the processor, an availability detector, a successful authentication identifier, and a full authentication generator. The availability detector, successful authentication identifier, and full authentication generator each have machine readable instructions stored in the memory that when executed by the processor implement functionality of the availability detector, successful authentication identifier, and full authentication generator. The availability detector verifies that the primary access control server remains unavailable. The successful authentication identifier requests, from a history server, previous authentication information for a previous communication occurring during a predefined authentication period and corresponding to the unique identifying information. When the primary access control server is verified as remaining unavailable, the full authentication generator upgrades authentication of the unique identifying information to the full authentication based upon the previous authentication information retrieved from the history server and sends an indication of the full authentication to the website. The full authentication has a higher likelihood of being accepted for further processing of the unique identifying information than a partial authentication.

DETAILED DESCRIPTION OF THE EMBODIMENTS

Figure 1:
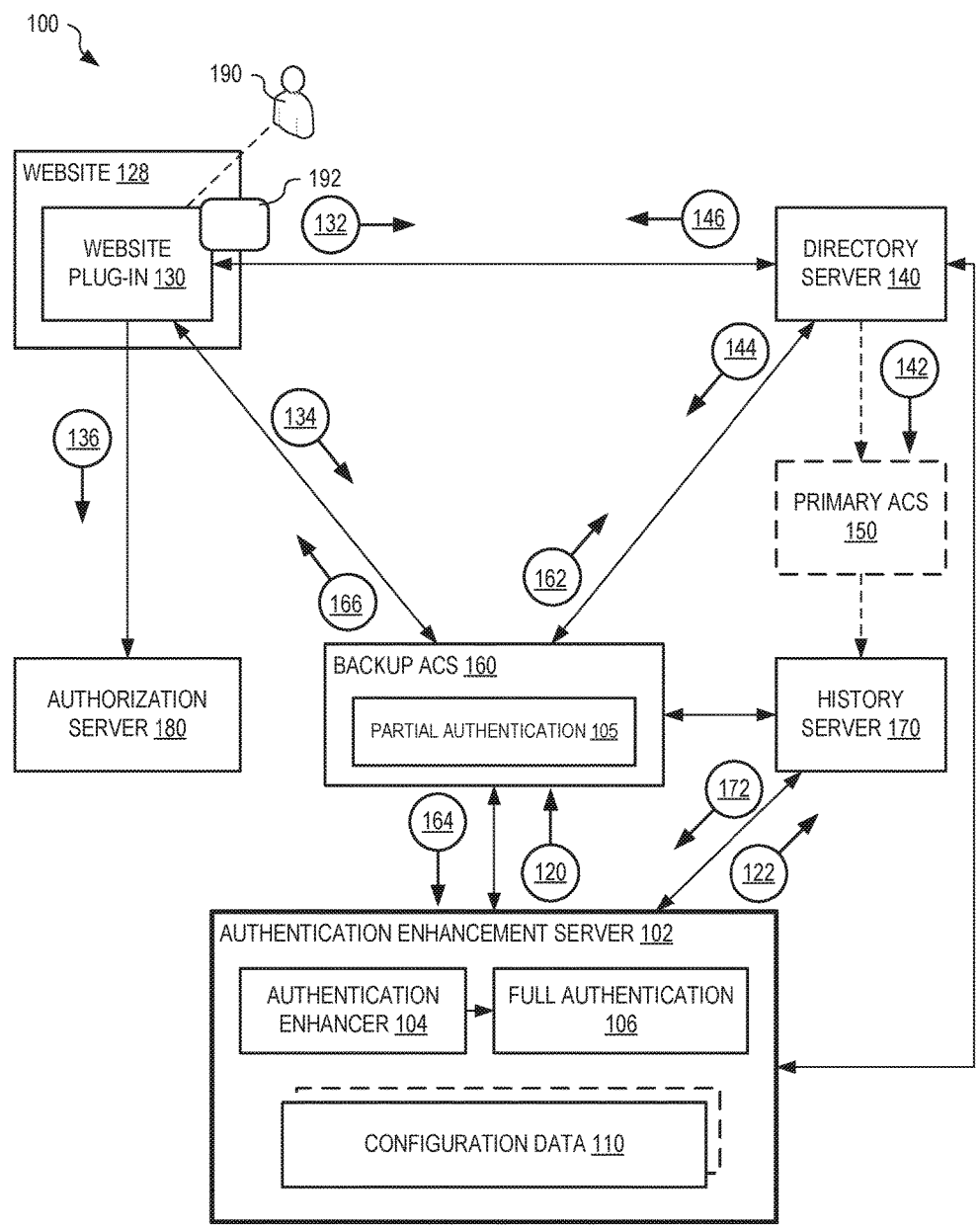
FIG. 1 shows one example system for enhancing authentication procedures in an anti-fraud environment, in an embodiment.

Systems, methods, and non-transitory computer readable media with computer executable instructions described herein teach of enhancing authentication procedures in an anti-fraud environment, when authentication of unique identifying information entered onto a website by a requestor is not possible because a primary access control server (primary ACS) is not available. The requestor interacts with a website to request items from an entity associated with the website and enters unique identifying information. The primary ACS is invoked to authenticate the unique identifying information, and may verify additional information (e.g., password and/or PIN) provided by the requestor against previously configured values as a way to authenticate the unique identifying information.

When the primary ACS is unavailable, or unable to respond within a required period, to authenticate the unique identifying information, a backup access control server (backup ACS) may be invoked to validate the unique identifying information and allow its subsequent use. For example, the backup ACS may verify at least part of the unique identifying information against stored information, but does not request or validate additional information (e.g., password and/or PIN), since expected values for these responses are not available within the backup ACS. When at least part of the unique identifying information is valid, the backup ACS issues a partial authentication and not a full authentication; the partial authentication being at a lower level than the full authentication.

However, the operation to provide the requested items to the requestor is often not fulfilled because recipients (e.g., the entity associated with the website) of a partial authentication may determine that the partial authentication is not sufficient to fulfill the request of the requestor. Thus, when the primary ACS is unavailable, the entity associated with the web site may not allow or perform many operations through the website. Such unavailability is not, itself, typically a reflection that the unique identifying information is invalid, and may occur because of communication failures, excessive workload of the primary ACS, maintenance of the primary ACS, and so on.

In embodiments, to enhance authentication procedures in an anti-fraud environment, systems and methods hereof provide intelligence to 1) verify the primary ACS remains unavailable, 2) evaluate previous authentication information corresponding to the unique identifying information, and 3) issue full authentication for the unique identifying information when the risk of erroneously issuing the full authentication are determined to be below an acceptable level. An entity corresponding to the primary ACS may subscribe to use these enhanced authentication procedures to allow full authentication to be issued under certain circumstances when the primary ACS is unavailable such that subsequent users of the unique identifying information are aware of the reduced risk and the requested items can be sent to the requestor and remuneration received therefore.

As compared to other primary ACS-associated entities not using the enhanced authentication procedures disclosed herein, the requested items are more likely to ultimately be sent to a requestor that can avail themselves (through a primary ACS-associated entity) of the enhanced authentication procedures, and thus the requestor may be more likely to select that latter entity over the others. In other words, a requestor may choose a particular entity if they know that by doing so their unique identifying information is more likely to receive full authentication.

These enhanced authentication procedures are envisioned in embodiments to extend (i.e., are an add-on) to existing authentication services (e.g., the well-known 3-D Secure authentication protocol for online transactions), to increase acceptability of the entity by the requestor, to provide more successful operations for the website entity, and thereby provide greater satisfaction for both the requestor and the website entity in the anti-fraud environment.

FIG. 1 shows one example system 100 for enhancing authentication procedures in an anti-fraud environment. System 100 includes an authentication enhancement server 102 that is communicatively coupled to a backup ACS 160 and a history server 170. FIG. 1 also shows a website plug-in 130, implemented within a website 128 that is communicatively coupled with a directory server 140 and an authorization server 180.

In the example of FIG. 1, a requestor 190 interacts (e.g., by using a computer connected to website 128 via the Internet) with website 128 and/or website plug-in 130 to generate unique identifying information 192. Website plug-in 130, configured with website 128, sends unique identifying information 192 within communication 132 to directory server 140. Directory server 140 operates to convey unique identifying information 192 to a corresponding primary ACS 150 that is identified based upon unique identifying information 192. System 100 may include more than one primary ACS, and directory server 140 may interact with more than one website plug-in. Unique identifying information 192 may include identification of an entity corresponding to website 128 that allows directory server 140 to determine whether that entity is participating in a secondary authentication program (e.g., 3-D secure). Unique identifying information 192 may also include a personal account number (PAN) that uniquely identifies requestor 190 and that is used by directory server 140 to identify primary ACS 150 and determine whether the entity associated with primary ACS 150 is also enrolled in the secondary authentication program. Accordingly, in embodiments, directory server 140 sends a communication 142 containing unique identifying information 192 to primary ACS 150. In normal operation, primary ACS 150 responds to communication 142 and facilitates authentication (e.g., 3-D secure) of unique identifying information 192, for example, by verifying secondary security information (e.g., a password and/ or PIN) of requestor 190, and generating full authentication. However, when primary ACS 150 is unavailable, such as when offline or heavily loaded, and does not respond to communication 142, embodiments envision that directory server 140 sends unique identifying information 192, within a communication 144 as an authentication request, to backup ACS 160 for validation.

In embodiments, backup ACS 160 validates unique identifying information 192 and generates a partial authentication 105 if unique identifying information 192 is determined valid. However, backup ACS 160 does not generate a full authentication 106 since it does not store information of requestor 190 to allow it to verify secondary security information. Full authentication 106 and partial authentication 105 can be flags or values indicating the authentication level determined for the unique identifying information 192.

To enhance authentication procedures in an anti-fraud environment, backup ACS 160 sends unique identifying information 192 within communication 164 (i.e., the current communication) to an authentication enhancer 104 of authentication enhancement server 102. Authentication enhancer 104 performs a sequence of logical tests to determine whether the partial authentication for unique identifying information 192 is upgradable to full authentication 106, as described in detail below. For example, authentication enhancer 104 determines whether an entity corresponding to primary ACS 150 has enrolled or subscribed to the service for enhancing authentication procedures implemented by authentication enhancement server 102. If the entity is enrolled or subscribed, authentication enhancer 104 then requests, illustratively shown as communications 122, information corresponding to unique identifying information 192 from history server 170, and also verifies that primary ACS 150 is unavailable. Then, authentication enhancer 104 determines whether upgrading the partial authentication to the full authentication is below the level of risk that the entity is willing to accept as defined within configuration data 110.

Where authentication enhancer 104 determines that the entity has enrolled or subscribed to the service for enhancing authentication procedures and that the current circumstances meet the corresponding level of risk defined by the entity, then authentication enhancer 104 generates and sends a full authentication 106 to backup ACS 160 as communication 120. Backup ACS 160 then sends communication 166 to website plug-in 130 indicating full authentication 106 provided by authentication enhancer 104, or indicating partial authentication 105 when not upgradable to full authentication 106. Website plug-in 130 may then submit the unique identifying information 192 with full authentication 106 for subsequent processing, such as by authorization server 180 within communication 136. Authorization server 180, based upon full authentication 106, may authorize remuneration of the entity associated with website 128 from the account of requestor 190 identified within unique identifying information 192, for example.

Figure 2:
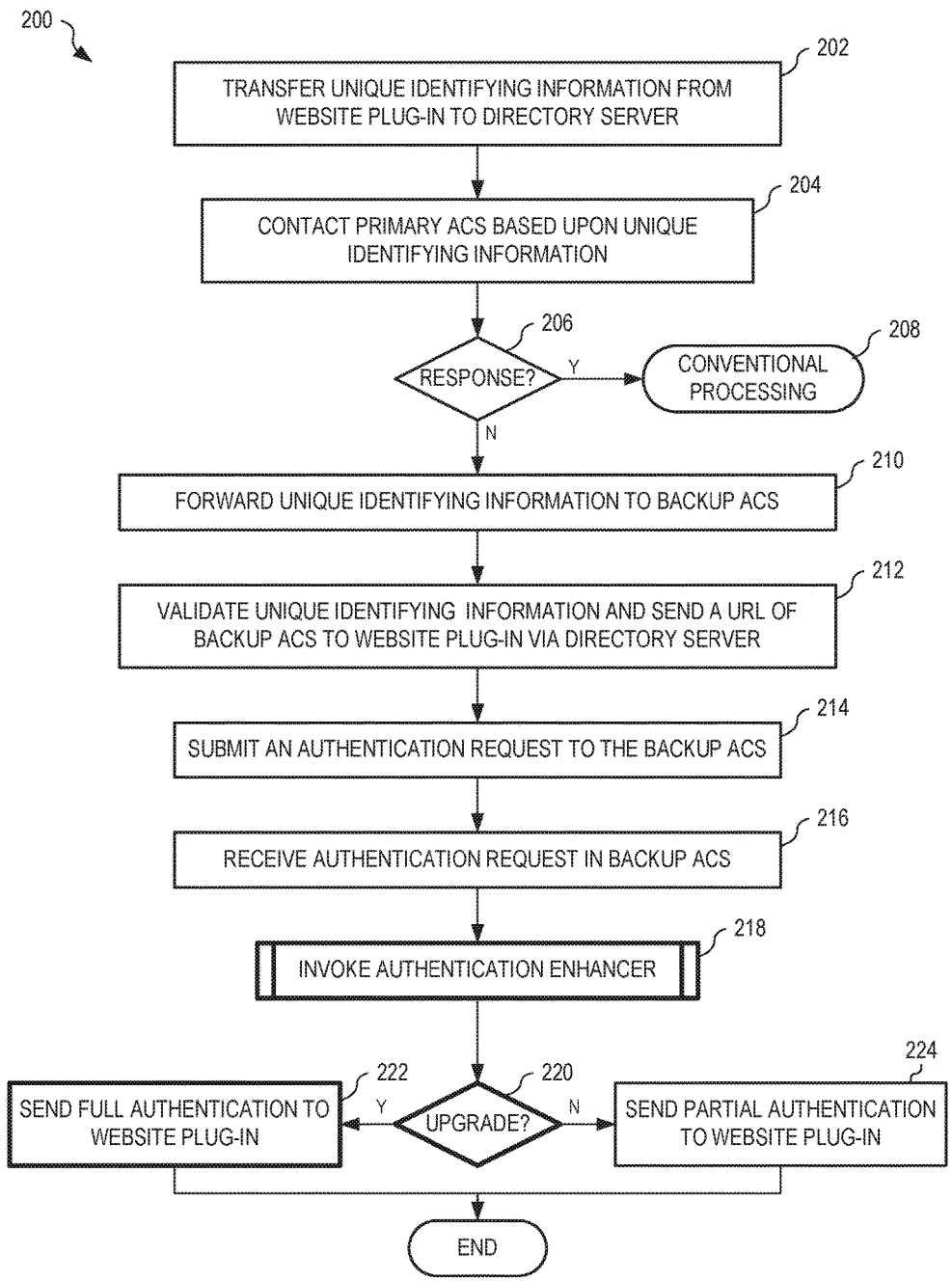
FIG. 2 is a flowchart illustrating one example method for enhancing authentication procedures in an anti-fraud environment, in an embodiment.

FIG. 2 is a flowchart illustrating one example method 200 for enhancing authentication procedures in an anti-fraud environment. Steps 202 and 214 of method 200 are implemented within website plug-in 130, for example. Steps 204, 206 and 210 are implemented within directory server 140 for example. Steps 212 and 216-224 are implemented within backup ACS 160 for example. Steps 210-216 and 224 represent a stand-in authentication for when primary ACS 150 is unavailable. Steps 218 through 222 represent enhanced authentication procedures implemented within backup ACS 160 to invoke method 300 of FIG. 3. Of course, it should be understood that the steps described herein can be implemented within various other components mentioned or otherwise contemplated herein.

In step 202, method 200 transfers unique identifying information from website plug-in to directory server. In one example of step 202, website plug-in 130 sends communication 132 containing unique identifying information 192 to directory server 140. In step 204, method 200 contacts the primary ACS based upon the unique identifying information. In one example of step 204, directory server 140 sends communication 142 to primary ACS 150.

Step 206 performs a decision. If, in step 206, method 200 determines that no response was receive from the primary ACS, method 200 continues with step 210; otherwise method 200 continues with step 208 where conventional processing of the unique identifying information occurs.

In step 210, method 200 forwards the unique identifying information to a backup ACS. In one example of step 210, directory server 140 sends communication 144 as an authentication request and containing unique identifying information 192 to backup ACS 160. In step 212, method 200 validates the unique identifying information and sends a verification response communication with an address of the backup ACS to the website plug-in via the directory server. In one example of step 212, in an embodiment where backup ACS 160 is an attempts server of a card service such as MasterCard®, backup ACS 160 sends verification response communication 162 (e.g., a "VEres Y" message) with a universal resource locator (URL) of backup ACS 160 to directory server 140 for delivery, illustratively shown as communication 146, to website plug-in 130, thereby enabling website plug-in 130 to communicate directly with backup ACS 160. The VEres Y message serves as an indication to website plug-in 130 that requestor 190 is enrolled for participation in the secondary authentication program (e.g., 3-D secure) and that either (a) further authentication of unique identifying information 192 is possible by primary ACS 150, or (b) that further authentication of unique identifying information 192 is possible by backup ACS 160.

In step 214, method 200 submits an authentication request to the backup ACS. In one example of step 214, in an embodiment where backup ACS 160 is an attempts server of a card service, website plug-in 130 sends a perform authentication communication 134 to backup ACS 160 using the attempt ACS URL. In step 216, method 200 receives the perform authentication request within the backup ACS. In one example of step 216, in the embodiment where backup ACS 160 is the attempts server of the card service, perform authentication communication 134 is a PA-REQ message received by backup ACS 160 from website plug-in 130 in response to verification response communication 162. In this example, perform authentication communication 134 serves as a request from website plug-in 130 for authentication of unique identifying information 192.

In step 218, method 200 invokes an authentication enhancer. In one example of step 218, backup ACS 160 sends communication 164 to authentication enhancement server 102 to invoke authentication enhancer 104 to determine whether unique identifying information 192 can be upgraded to a full authentication.

Step 220 performs a decision. If, in step 220, method 200 determines that the authentication enhancer has upgraded to a full authentication, method 200 continues with step 222; otherwise method 200 continues with step 224. In step 222, method 200 sends a full authentication to the website plug-in. In one example of step 222, backup ACS 160 sends communication 166 to website plug-in 130 with full authentication 106 to allow website plug-in 130 to proceed as if secondary authentication had been successfully performed by primary ACS 150. Method 200 then terminates.

In step 224, method 200 sends a partial authentication to the website plug-in. In one example of step 224, backup ACS 160 sends communication 166 to website plug-in 130 with partial authentication 105 since the partial authentication could not be upgraded to full authentication 106. Method 200 then terminates.

Method 200 thereby enhances authentication procedures by providing the ability for full authentication of unique identifying information when the primary ACS is unavailable but when the risk of doing so is acceptable to the entity associated with the primary ACS, as determined by authentication enhancer 104. For example, the entity associated with the primary ACS defines an acceptable level of risk by setting parameters within configuration data 110, such that, when the primary ACS is unavailable, authentication enhancement server 102 may evaluate the risk of upgrading partial authentication 105 to full authentication 106 for communication 166. Full authentication 106 has a higher likelihood of being accepted for further processing of the unique identifying information by authorization server 180 than partial authentication 105.

Figure 3:
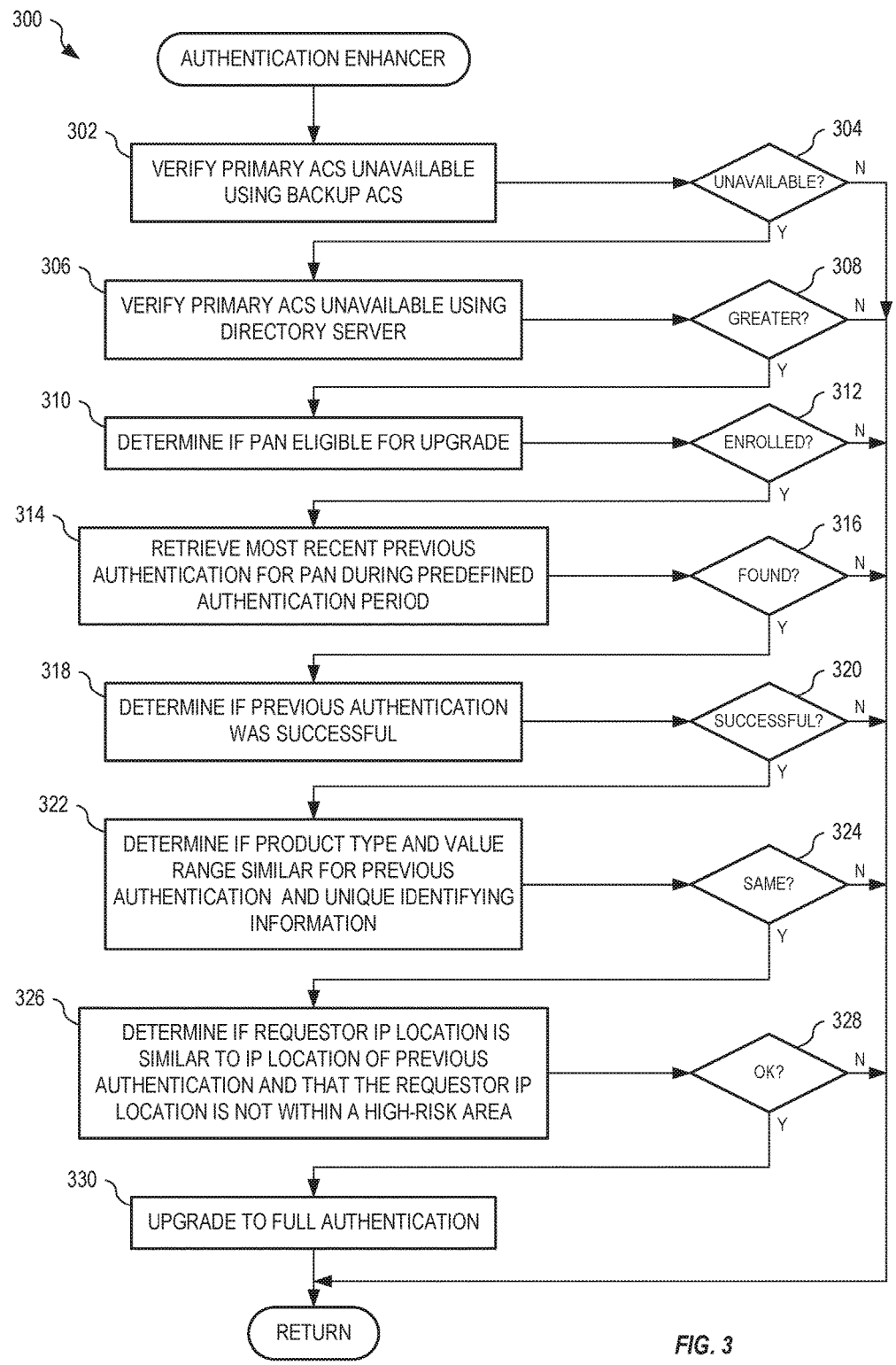
FIG. 3 is a flowchart illustrating an example method for upgrading a partial authentication to a full authentication, in an embodiment.
Figure 4:
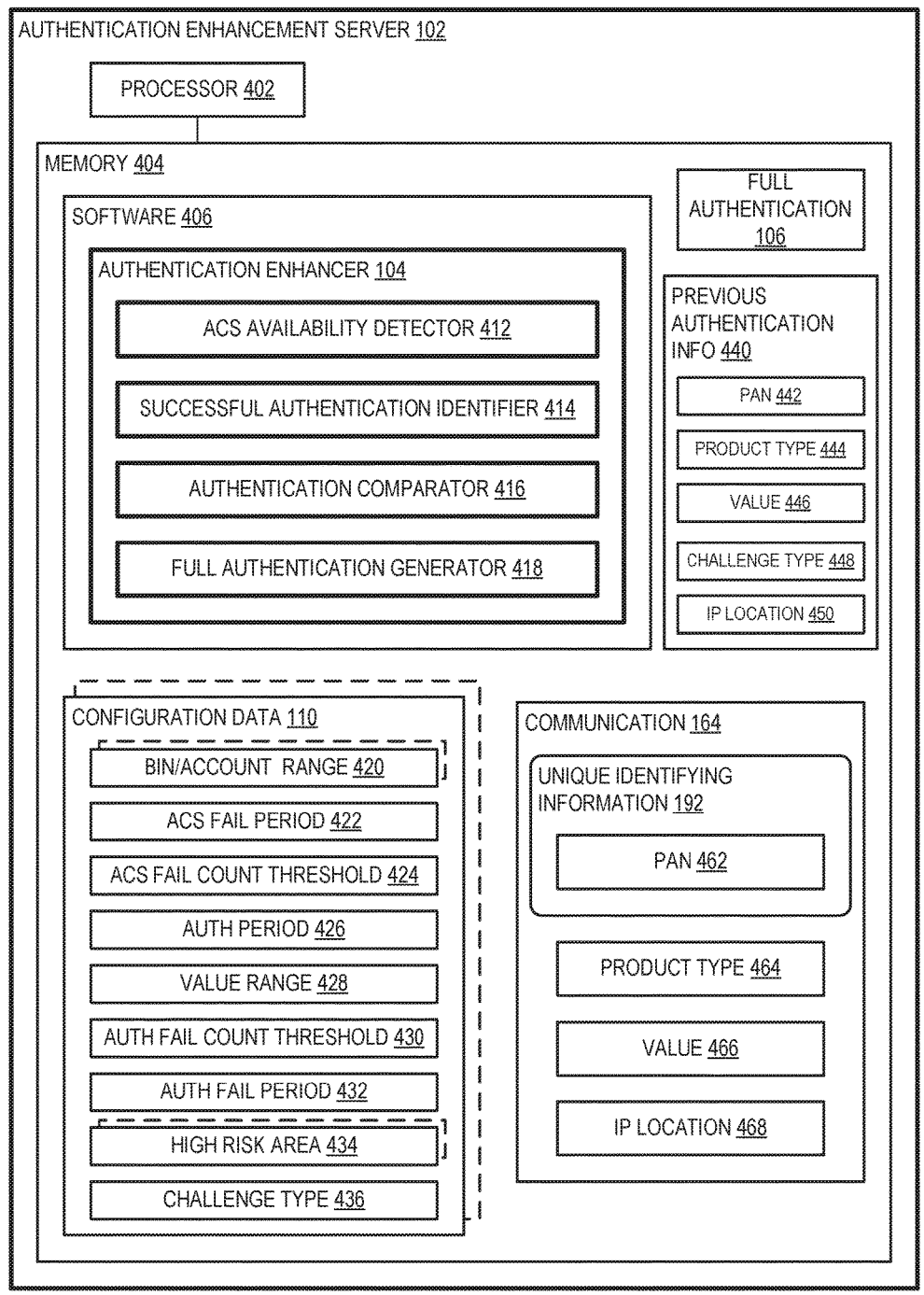
FIG. 4 shows the authentication enhancement server of FIG. 1 in further detail, in an embodiment.

FIG. 3 is a flowchart illustrating an example method 300 for upgrading a partial authentication to a full authentication. Method 300 is implemented in authentication enhancer 104, for example. FIG. 4 shows an embodiment of authentication enhancement server 102 of FIG. 1 in further detail. FIGS. 3 and 4 are best viewed together with the following description.

In the following examples, requestor 190 is requesting items from the entity associated with website 128. Requestor 190 provides unique identifying information 192 to the website when requesting items or services. Unique identifying information 192 is submitted, via website plug-in 130 within communication 132 such that the entity receives remuneration for the items or service provided to the requestor. FIG. 4 illustratively shows unique identifying information 192 within communication 164 as received from backup ACS 160. As shown, communication 164 may contain other information corresponding to requested items of website 128 such as a product type 464, a value 466 and an internet provider (IP) location 468 (i.e., a geographic location corresponding to the IP address) of the requestor. In one embodiment, partial authentication 105 may be indicated using an attempts accountholder authentication value (AAV) and full authentication 106 may be indicated using a full AAV where the attempts AAV and the full AAV define a level of risk when using unique identifying information 192 (and other information of communication 164) in future actions, such as initiating remuneration to the entity associated with website 128 for items requested by requestor 190.

In embodiments, authentication enhancement server 102 is a computer server that includes at least one processor 402 communicatively coupled with a memory 404. Memory 404 may be implemented as one or more of RAM, ROM, Flash, magnetic storage, optical storage, and database technology. In certain embodiments, memory 404 may be partially implemented as a network database.

In embodiments, at least part of memory 404 is a non-transitory computer readable medium and stores software 406 that includes machine readable instruction that are executable by processor 402 to provide functionality of authentication enhancement server 102 described herein. Software 406 implements authentication enhancer 104 and includes an ACS availability detector 412, a successful authentication identifier 414, an authentication comparator 416, and a full authentication generator 418. Software 406 and/or authentication enhancer 104 may include other software modules without departing from the scope hereof.

Unique identifying information 192 includes a PAN 462 that uniquely identifies an account of requestor 190. For example, PAN 462 has a sixteen digit number that identifies an account provided to requestor 190 by the entity associated with primary ACS 150. Unique identifying information 192 may include name and address of requestor 190 and other identifying information without departing from the scope hereof. Requestor 190 provides PAN 462 when requesting items from the entity associated with website 128, wherein the entity uses website plug-in 130 and PAN 462 to request remuneration for the items from the requestor's account, such as by submitting information of communication 164 to an authorization server 180. In one embodiment, authentication enhancement server 102, website plug-in 130, directory server 140, backup ACS 160, history server 170, and authorization server 180 represent services associated with the requestor's account.

In step 302, method 300 verifies that the primary ACS is unavailable using the backup ACS. In one example of step 302, ACS availability detector 412 retrieves a count of communications 144 (e.g., authentication requests) received by backup ACS 160 from directory server 140 within a predefined ACS fail period 422 for primary ACS 150 based upon a bank identification number (BIN) determined from PAN 462. ACS availability detector 412 determines that primary ACS 150 has failed when the count is greater than an ACS fail count threshold 424. ACS fail period 422 and ACS fail count threshold 424 are defined by the entity corresponding to primary ACS 150. ACS availability detector 412 thus determines a spike or increase in overall volume of communications processed by backup ACS 160 for primary ACS 150, where primary ACS 150 handles all account ranges for a corresponding BIN. In one embodiment, ACS availability detector 412 may determine, from backup ACS 160 for example, that many or all primary ACSs of system 100, including primary ACS 150, are unavailable, as may occur when directory server 140 and/or at least part of the interconnecting network (e.g., the Internet) have failed. Step 304 performs a decision. If, in step 304, method 300 determines that the primary ACS is unavailable, method 300 continues with step 306; otherwise method 300 terminates without upgrading to full authentication.

In step 306, method 300 verifies that the primary ACS is unavailable using the directory server. In one example of step 306, ACS availability detector 412 determines an account range that includes PAN 462 and sends, to directory server 140, a request for a count of failed requests in the last authentication fail period 432 and corresponding to the account range. Directory server 140 returns the count of failed requests for the account range to ACS availability detector 412. In another example of step 306, where primary ACS 150 authenticates for a plurality of different entities, ACS availability detector 412 determines, based upon PAN 462, a BIN corresponding to primary ACS 150, and sends, to directory server 140, a request for a count of failed requests in the last authentication fail period 432 and corresponding to the BIN. Directory server 140 returns the count of failed requests for the BIN to ACS availability detector 412. ACS availability detector 412 determines that primary ACS 150 is unavailable when the count is greater than an authentication fail count threshold 430 defined within configuration data 110. Authentication fail count threshold 430 is for example ten and authentication fail period 432 is for example the last five minutes.

Step 308 performs a decision. If, in step 308, method 300 determines that the count is greater than authentication fail count threshold 430, method 300 continues with step 326; otherwise, method 300 terminates without upgrading to full authentication.

Where primary ACS 150 becomes unavailable, backup ACS 160 experiences an increase in messages (e.g., communication 144) from directory server 140 corresponding to primary ACS 150. In one embodiment, directory server 140 and/or backup ACS 160 may be configured with monitoring software (not shown) to detect such increases in traffic volume for consecutive period and to indicate unavailability of primary ACS 150 to authentication enhancer 104 when the increase indicates a failure of the primary ACS 150. For example, by monitoring, for each primary ACS within system 100, traffic volume of messages flowing to backup ACS 160, directory server 140 and/or backup ACS 160 may detect when primary ACS 150 becomes unavailable based upon the increase in traffic volume. In another embodiment, by monitoring traffic volume flowing to backup ACS 160 for all primary ACS within system 100, directory server 140 and/or backup ACS 160 may determine when an increase in traffic volume indicates a system wide failure. In another embodiment, where directory server 140 communicates with primary ACS 150 using other protocols and messages (e.g., system level messaging), directory server 140 may detect when primary ACS 150 becomes unresponsive to these message and indicate such unavailability to backup ACS 160 and/or authentication enhancement server 102.

In step 310, method 300 determines if the PAN is eligible for upgrade. In one example of step 310, authentication enhancer 104 compares PAN 462 to one or more BIN/account ranges 420 defined within configuration data 110. Authentication enhancer 104 determines that PAN 462 is eligible when it falls within one of BIN/account ranges 420. For example, the entity associated with primary ACS 150 may specify, within configuration data 110, one or more BIN/account ranges 420 that define which PANs are eligible for upgrade. In one example, using BIN/account range 420, the entity defines a BIN corresponding to all PANs that are processed by primary ACS 150. In another example, using BIN/account range 420, the entity defines an account range corresponding to a subset of PANs handled by primary ACS 150. Thus, the entity may make all PANs corresponding to primary ACS 150 eligible for upgrade, or may make one or more sub-sets of those PANs eligible for upgrade. Step 312 performs a decision. If, in step 312, method 300 determines that PAN 462 is eligible for upgrade, method 300 continues with step 314; otherwise method 300 terminates without upgrading to full authentication.

In step 314, method 300 retrieves a most recent previous authentication for the PAN during a predefined authentication period. In one example of step 314, successful authentication identifier 414 interrogates history server 170 to retrieve, illustratively shown as communication 172, previous authentication information 440 corresponding to PAN 462 received within a previous communication that occurred within an authentication period 426 defined within configuration data 110. For example, history server 170 may match PAN 442 of previous authentication information 440 to PAN 462. Authentication period 426 is defined by the entity corresponding to primary ACS 150. Step 316 performs a decision. If, in step 316, method 300 determines that at least one authentication was retrieved, method 300 continues with step 318; otherwise method 300 terminates without upgrading to full authentication.

In step 318, method 300 determines if the retrieved previous authentication was successful. In one example of step 318, successful authentication identifier 414 evaluates previous authentication information 440 and determines whether previous authentication information 440 has a challenge type 448 indicating that the type and strength of secondary authentication used for previous authentication information 440 is equal to or greater than a type and strength defined within a challenge type 436 of configuration data 110 and that previous authentication information 440 resulted in the generation of a full authentication. For example, previously operational primary ACS 150 generated previous authentication information 440 using one of several different types of secondary authentication, such as a static password, one time password (OTP), biometric authentication and seamless risk based authentication. These different types of secondary authentication have different strengths. Challenge type 448 thereby indicates the strength of the secondary authentication used for previous authentication information 440 and may be used by successful authentication identifier 414 to determine whether partial authentication 105 may be upgraded to full authentication 106. For example, where configuration data 110 defines challenge type 436 as not null, it indicates that, provided one type of secondary authentication was successfully performed for previous authentication information 440 (as indicated by challenge type 448 being other than null), partial authentication 105 can be upgraded to full authentication 106. In another example, where challenge type 436 of configuration data 110 indicates an OTP type secondary authentication and where challenge type 448 of previous authentication information 440 indicates a secondary authentication type of biometric authentication, partial authentication 105 may be upgraded to full authentication 106, where biometric authentication is considered stronger than OTP. However, continuing with this example, where challenge type 448 indicates a secondary authentication type of static password, partial authentication 105 may not be upgraded to full authentication 106, where static password type secondary authentication is considered not as strong as OTP type secondary authentication. Thus, authentication enhancer 104 upgrades partial authentication 105 to full authentication 106 only when the authentication strength indicated by challenge type 436 is met or exceeded by the authentication strength indicated by challenge type 448 of previous authentication information 440. That is, for previous authentication information 440, successful authentication identifier 414 determines whether a full authentication resulted and that the full authentication utilized secondary security information (e.g., a password and/or PIN) was of a type having a strength greater or equal to that indicated by challenge type 436 of configuration data 110.

Step 320 performs a decision. If, in step 320, method 300 determines that the retrieved authentication was successful, method 300 continues with step 322; otherwise, method 300 terminates without indicating upgrade.

In step 322, method 300 determines if a product type and a value are similar for the previous authentication and the unique identifying information. In one example of step 322, authentication comparator 416 compares a product type 464, determined from or included within, communication 164 with a product type 444 of previous authentication information 440 to determine if they are of a similar category (e.g., a toy store is not similar to an automobile showroom). Authentication comparator 416 also compares a value 466 within or associated with communication 164 to a value 446 within previous authentication information 440 to determine whether the difference therebetween is within a value range 428 defined within configuration data 110. In one example, value range 428 is one hundred dollars. In another example, value range 428 defines range values based upon product categories. In another example, value range 428 is a percentage defined as ten percent, wherein value 466 is similar to value 446 when within ten percent variation of value 446. Step 324 performs a decision. If, in step 324, method 300 determines that the product types and the values are similar, method 300 continues with step 326; otherwise, method 300 terminates without upgrading to full authentication.

In step 326, method 300 determines if a requestor internet provider (IP) address location is similar to the IP location of the previous authentication and that the requestor IP address location is not within a high-risk area. In one example of step 326, authentication comparator 416 determines if IP location 468 of communication 164, corresponding to a geographic location of requestor 190 when entering unique identifying information 192, is the same as IP location 450 of previous authentication information 440. Authentication comparator 416 may also determine whether IP location 468 is within a previously defined high-risk area 434 of configuration data 110. For example, certain geographic areas may be predefined as having a high-risk of fraud, wherein authentication comparator 416 may indicate that the risk is not OK when IP location 468 is within one of the high-risk area. Step 328 performs a decision. If, in step 328, method 300 determines that the locations are the same and that the location is not within a high-risk area, method 300 continues with step 330; otherwise method 300 terminates without upgrading to full authentication.

In step 330, method 300 upgrades to full authentication. In one example of step 330, authentication enhancer 104 utilizes full authentication generator 418 to generate full authentication 106 for unique identifying information 192.

The entity associated with primary ACS 150 may define configuration data 110 to manage the level of risk taken when primary ACS 150 is unavailable and authentication of unique identifying information 192 is upgraded to full authentication 106 from partial authentication 105 (i.e., from attempts AAV to full AAV).

In one embodiment, primary ACS 150 is an issuer ACS and the entity associated with primary ACS 150 is an issuer (e.g., an issuing bank), the entity associated with website 128 is a merchant, and requestor 190 is a cardholder who uses an account identified by PAN 462 that is provided by the issuing bank, and backup ACS 160 corresponds to an attempts server of a service (e.g., MasterCard, Visa, etc.).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for enhancing authentication procedures in an anti-fraud environment when a primary access control server is unavailable to generate a full authentication for requestor identifying information received in a current communication from a website, the full authentication of the requestor identifying information verifying a particular requestor and a partial authentication of the requestor identifying information not verifying the particular requestor, the method comprising:

verifying that the primary access control server remains unavailable to generate the full authentication;

requesting, from a history server, previous authentication information for a previous communication occurring during a predefined authentication period and corresponding to the requestor identifying information;

when the primary access control server is verified as remaining unavailable, upgrading authentication of the requestor identifying information to the full authentication based upon the previous authentication information retrieved from the history server, upgrading authentication of the requestor identifying information including determining a first product type and a first cost from the previous authentication information, the first product type belonging to a first product category and the first cost having a value in a first range of costs, determining a second product type and a second cost from a communication containing the requestor identifying information, the second product type belonging to a second product category, and upgrading the requestor identifying information to the full authentication when the second product category is the same as the first product category and the second cost is within the first range of costs; and sending an indication of the full authentication to the website when authentication is upgraded to the full authentication.

2. The method of claim 1, the step of verifying comprising determining a count of authentication requests received by a backup access control server during a predefined fail period for the primary access control server, wherein the backup access control server is configured to generate the partial authentication for the requestor identifying information, and wherein the primary access control server is verified as remaining unavailable when the count of authentication requests is greater than a predefined fail count threshold.

3. The method of claim 1, the step of upgrading comprising determining a challenge type of the previous authentication information, wherein the requestor identifying information is upgraded to the full authentication when the challenge type indicates that the previous authentication information was authenticated using secondary security information.

4. The method of claim 1, wherein the primary access control server is operated by an issuer corresponding to an account of the particular requestor that is identified within the requestor identifying information.

5. The method of claim 1, the step of verifying further comprising retrieving, from a directory server, a count of failed requests corresponding to the primary access control server during a predefined fail period, wherein the primary access control server is verified as remaining unavailable when the count of failed requests is greater than a predefined fail threshold.

6. The method of claim 1, the step of upgrading comprising:

determining a first geographic location from the previous authentication information;

determining a second geographic location from the requestor identifying information; and upgrading the requestor identifying information to the full authentication when the first geographic location is the same as the second geographic location.

7. A non-transitory computer readable medium with computer executable instructions stored thereon executed by a processor to perform a method for enhancing authentication procedures in an anti-fraud environment when a primary access control server is unavailable to generate a full authentication requestor identifying information received in a current communication from a website, the full authentication of the requestor identifying information verifying a particular requestor and a partial authentication of the requestor identifying information not verifying the particular requestor, the method comprising:

verifying that the primary access control server remains unavailable to generate the full authentication;

requesting, from a history server, previous authentication information for a previous communication occurring during a predefined authentication period and corresponding to the requestor identifying information;

when the primary access control server is verified as remaining unavailable, upgrading authentication of the requestor identifying information to the full authentication based upon the previous authentication information retrieved from the history server, upgrading authentication of the requestor identifying information including
  determining a first product type and a first cost from the previous authentication information, the first product type belonging to a first product category and the first cost having a value in a first range of costs,
  determining a second product type and a second cost from a communication containing the requestor identifying information, the second product type belonging to a second product category, and
  upgrading the requestor identifying information to the full authentication when the second product category is the same as the first product category and the second cost is within the first range of costs; and
sending an indication of the full authentication to the website when authentication is upgraded to the full authentication.

8. The non-transitory computer readable medium of claim 7, the step of upgrading comprising:
  determining, based upon an IP address used provide the requestor identifying information to the website, a geographic location; and
  upgrading the requestor identifying information to the full authentication when the geographic location is not within a predefined high-risk area.

9. The non-transitory computer readable medium of claim 7, the step of verifying comprising determining a count of authentication requests received by a backup access control server during a predefined fail period for the primary access control server, wherein the backup access control server is configured to generate the partial authentication for the requestor identifying information, and wherein the primary access control server is verified as remaining unavailable when the count of authentication requests is greater than a predefined fail count threshold.

10. The non-transitory computer readable medium of claim 7, the step of upgrading comprising determining a challenge type of the previous authentication information, wherein the requestor identifying information is upgraded to the full authentication when the challenge type indicates that the previous authentication information was authenticated using secondary security information.

11. The non-transitory computer readable medium of claim 7, wherein the primary access control server is operated by an issuer corresponding to an account of the particular requestor that is identified within the requestor identifying information.

12. The non-transitory computer readable medium of claim 7, the step of upgrading comprising:
  determining a first geographic location from the previous authentication information;
  determining a second geographic location from the requestor identifying information; and
  upgrading the requestor identifying information to the full authentication when the first geographic location is similar to the second geographic location.

13. A system for enhancing authentication procedures in an anti-fraud environment when a primary access control server is unavailable to generate a full authentication for requestor identifying information received in a current communication from a website, the full authentication of the requestor identifying information verifying a particular requestor and a partial authentication of the requestor identifying information not verifying the particular requestor, comprising:
  a processor;
  a memory communicatively coupled with the processor;
  an availability detector having machine readable instructions stored in the memory that, when executed by the processor, are capable of verifying that the primary access control server remains unavailable to generate the full authentication;
  a successful authentication identifier having machine readable instructions stored in the memory that, when executed by the processor, are capable of requesting, from a history server, previous authentication information for a previous communication occurring during a predefined authentication period and corresponding to the requestor identifying information; and
  a full authentication generator and an authentication comparator having machine readable instructions stored in the memory that when executed by the processor are capable of:
    when the primary access control server is verified as remaining unavailable, upgrading authentication of the requestor identifying information to the full authentication based upon the previous authentication information retrieved from the history server, upgrading authentication of the requestor identifying information including
      determining a first product type and a first cost from the previous authentication information, the first product type belonging to a first product category and the first cost having a value in a first range of costs,
      determining a second product type and a second cost from a communication containing the requestor identifying information, the second product type belonging to a second product category, and
      upgrading the requestor identifying information to the full authentication when the second product category is in the same as the first product category and the second cost is within the first range of costs; and
    sending an indication of the full authentication to the website when authentication is upgraded to the full authentication.

14. The system of claim 13, the authentication comparator further having machine readable instructions stored in the memory that when executed by the processor are capable of:
  determining a first geographic location from the previous authentication information; and
  determining a second geographic location from the requestor identifying information;
  wherein the full authentication generator has machine readable instructions stored in the memory that when executed by the processor are capable of upgrading the requestor identifying information to the full authentication when the first geographic location is similar to the second geographic location and the second geographic location is not within a predefined high-risk area.

15. The system of claim 13, the availability detector having machine readable instructions stored in the memory that when executed by the processor are capable of determining a count of authentication requests received by a backup access control server during a predefined fail period for the primary access control server, wherein the backup access control server is configured to generate the partial authentication for the requestor identifying information, and wherein the primary access control server is verified as remaining unavailable when the count of authentication requests is greater than a predefined fail count threshold.

16. The system of claim 13, the authentication comparator further having machine readable instructions stored in the memory that when executed by the processor are capable of determining a challenge type of the previous authentication information, wherein the requestor identifying information is upgraded to the full authentication when the challenge type indicates that the previous authentication information was authenticated using secondary security information.

17. The system of claim 13, wherein the primary access control server is operated by an issuer corresponding to an account of the particular requestor that is identified within the requestor identifying information.

* * * * *